US007407436B2

(12) United States Patent
Groz

(10) Patent No.: US 7,407,436 B2
(45) Date of Patent: Aug. 5, 2008

(54) METHOD AND SYSTEM FOR INCREASING EXPECTED RATE OF RETURN AND MAXIMUM PAYOUT IN A GAME WITH ONE OR MORE PLAYERS

(76) Inventor: Marc Michael Groz, 244 Madison Ave., #377, New York, NY (US) 10016

( * ) Notice: Subject to any disclaimer, the term of this patent is extended or adjusted under 35 U.S.C. 154(b) by 884 days.

(21) Appl. No.: 10/043,071

(22) Filed: Jan. 8, 2002

(65) Prior Publication Data

US 2003/0125108 A1     Jul. 3, 2003

Related U.S. Application Data

(60) Provisional application No. 60/260,546, filed on Jan. 8, 2001, provisional application No. 60/260,547, filed on Jan. 8, 2001.

(51) Int. Cl.
*A63F 3/06* (2006.01)
*A63F 13/12* (2006.01)
*G06Q 40/00* (2006.01)

(52) U.S. Cl. ............................... 463/17; 463/25; 705/14

(58) Field of Classification Search ............ 463/16–22, 463/25, 26, 27, 28, 40–42; 705/14, 35, 36 R, 705/36 T, 37, 38, 39, 40, 41, 42, 43, 44, 45, 705/4; 273/278, 269, 139; 283/903; 902/23
See application file for complete search history.

(56) References Cited

U.S. PATENT DOCUMENTS

| 4,752,877 | A | * | 6/1988 | Roberts et al. ............ 705/36 R |
| 4,997,188 | A | * | 3/1991 | Nilssen ........................ 705/14 |
| 5,082,275 | A | * | 1/1992 | Nilssen ........................ 463/17 |
| 5,083,782 | A | * | 1/1992 | Nilssen ........................ 705/35 |
| 5,083,784 | A | * | 1/1992 | Nilssen ........................ 705/14 |
| 5,280,426 | A | * | 1/1994 | Edmonds ..................... 463/16 |
| 5,513,102 | A |   | 4/1996 | Auriemma |
| 5,987,433 | A | * | 11/1999 | Crapo ....................... 705/36 R |

(Continued)

FOREIGN PATENT DOCUMENTS

WO       WO 91/20061      * 12/1991

(Continued)

OTHER PUBLICATIONS

Ridge et al., Innovation in savings schemes: The bonus bonds trust in New Zealand, Financial Services Review, 1998.*

(Continued)

*Primary Examiner*—Robert E Pezzuto
*Assistant Examiner*—Matthew D. Hoel
(74) *Attorney, Agent, or Firm*—Mark Nowotarski

(57) ABSTRACT

A method for increasing the expected return of a game, such as a lottery, comprises selling tokens that have a residual value. The price of the tokens is divided between a prize pool and an investment fund. The game is played and the prizes are awarded from the prize pool. Assets are purchased with the investment fund such that the overall expected return of the game over a given period of time is positive. A commitment is made to provide the cash value of the assets to the owners of the tokens at the end of the period of time.

11 Claims, 7 Drawing Sheets

U.S. PATENT DOCUMENTS

| | | | | |
|---|---|---|---|---|
| 6,017,032 | A * | 1/2000 | Grippo et al. | 273/138.1 |
| 6,017,063 | A * | 1/2000 | Nilssen | 283/67 |
| 6,024,640 | A * | 2/2000 | Walker et al. | 463/17 |
| 6,028,920 | A | 2/2000 | Carson | |
| 6,110,042 | A * | 8/2000 | Walker et al. | 463/25 |
| 6,267,670 | B1 * | 7/2001 | Walker et al. | 463/17 |
| 6,278,983 | B1 * | 8/2001 | Ball | 705/36 R |
| 6,296,569 | B1 * | 10/2001 | Congello, Jr. | 463/17 |
| 6,321,212 | B1 * | 11/2001 | Lange | 705/36 R |
| 6,443,843 | B1 * | 9/2002 | Walker et al. | 463/42 |
| 6,666,768 | B1 * | 12/2003 | Akers | 463/40 |
| 6,702,673 | B2 | 3/2004 | Webb | |
| 6,832,210 | B1 * | 12/2004 | Li | 705/36 R |
| 6,856,971 | B1 * | 2/2005 | Sperandeo | 705/36 R |
| 2003/0104857 | A1 * | 6/2003 | Jenkins | 463/17 |
| 2005/0164767 | A1 * | 7/2005 | Wright | 463/17 |
| 2005/0164768 | A1 * | 7/2005 | Wright | 463/17 |
| 2005/0164770 | A1 * | 7/2005 | Wright | 463/17 |

FOREIGN PATENT DOCUMENTS

| | | | |
|---|---|---|---|
| WO | WO 01/77930 | A1 * | 10/2001 |
| WO | WO 02/47010 | A1 * | 6/2002 |
| WO | WO 02/094400 | A1 * | 11/2002 |

OTHER PUBLICATIONS

Guillen et al., Banking on gambling: Banks and lottery-llinked deposit accounts, Journal of Financial Services Research, Jun. 2002.*

Thompson et al., Political Culture and Gambling Policy: A Cross-National Study, UNLV Gaming Research and Review Journal, 2004.*

"Innovations in Savings Schemes: The Bonus Bonds Trust in New Zealand," Jenny Ridge and Martin Young, Financial Services Review 7(2), pp. 73 to 81, 1998.*

U.S. Appl. No. 60/254,053, filed Dec. 7, 2000, Paul A. Adao e Silva B.C., published as WO 02/47010 A1, PCT/US01/48587, expired.*

Journal of Financial Economics, "The Case of Swedish Lottery Bonds," by Green and Rynqvist, vol. 53, No. 2, 1999, pp. 145-187.*

Results of Science and Technical Information Center search for 10/043,071.*

U.S. Appl. No. 60/254,053, filed Dec. 7, 2000, Paul A. Adao e Silva B.C., published as WO 02/47010 A1, PCT/US01/48587, expired.*

"A Global Lottery and a Global Premium Bond," Addison, et al., United Nations University Discussion Paper 2003/80.*

Wikipedia article on "Venture Capital," downloaded from www.wikipedia.org, Nov. 30, 2006.*

Proquest.citation of Nebraska Lottery tickets, "Arizona Republic," Phoenix, AZ, Mar. 28, 1999, p. B2, ProQuest ID 40136311, downloaded from proquest.umi.com, Mar. 25, 2006.*

U.S. Appl. No. 60/254,053, published as WO 02/47010 A1.*

"Scarne's Complete Guide to Gambling," by John Scarne, 1961, Simon & Schuster, New York, chapter on lotteries.*

Keizer v. Bradley, Emery v. Ronden, Griffith v. Kanarnaru, Reed v. Tornqvist, downloaded from iplaw.bna.com, Jul. 16, 2007.*

"Preparing Your Business for Venture Capital Investment," by B. Kay Carel, Journal Record, Oklahoma City, Oklahoma, Sep. 28, 2000, p. 1, downloaded from http://proquest.umi.com, Feb. 29, 2008.*

"What Are Premium Bonds?", Financial Services Authority of the UK Government,, www.fsa.gov.uk/consumer/financial_faqs/national_savings/mn_premium.html (last viewed Jun. 2, 2004).

Ward, Simon, "What Are Premium Bonds?", Microsoft Money, http://money.msn.co.uk/bank_plan/savings/premiumbonds/info/whatarepremiumbonds/default.asp?printer=true (last viewed Jun. 2, 2004).

Robert D. Hunter, "Emergency Actions", http://web.archive.org/web/20001018232538/http://www.webpatent.com/costs.htm, Aug. 17, 2000.

* cited by examiner

METHOD AND SYSTEM FOR INCREASING EXPECTED RATE OF RETURN AND MAXIMUM PAYOUT IN A GAME WITH ONE OR MORE PLAYERS

CROSS-REFERENCE TO RELATED APPLICATIONS

This application claims benefit of U.S. Provisional Patent Application Nos. 60/260,546, filed Jan. 8, 2001 and 60/260, 547, filed Jan. 8, 2001, both of which are hereby incorporated by reference.

BACKGROUND OF THE INVENTION

The global gaming industry is enormous, generating many billions of dollars in annual revenue. It is a significant part of the global economy, with important relationships to the global travel, entertainment, and telecommunications industries. Directly and indirectly, the global gaming industry entertains and employs millions of people.

For all its value to the global economy, gaming has an obvious downside. The vast majority of customers of the gaming industry lose money. This is true whether they visit casinos, place bets over the internet, or buy lottery tickets. Most of these losses are small; some, however, are catastrophic to the people involved.

Current games typically have—for the average player— negative expected rates of return, with the house receiving cumulative net gains. Obviously, there are individual players who win money, hot tables, etc., but these are, for the most part, statistical anomalies and do not disprove the above statement.

A more serious exception should be noted: occasionally, a player devises a way to "beat the dealer" at his own game. In such cases, a window opens in which, for certain players, the true expected rate of return is greater than the house believes.

In short order, the house adapts, either by changing the game or ejecting the excessively successful player(s); otherwise the game soon ends, for the simple reason that the house cannot afford to play a losing game indefinitely, any more than a player can.

Another limitation of the gaming industry is that large prizes cannot be offered unless some entity is willing to accept the risk of payout. For example, assume that a lottery wishes to offer a one billion dollar prize with appropriately long odds against anyone winning the prize. The prize cannot be offered unless a backer willing to accept the risk of payout can be found. Insurance and reinsurance companies offer backing for certain rare events, such as holes-in-one; but for truly enormous prizes there may be no entity ready to accept the risk.

BRIEF SUMMARY OF THE INVENTION

The present invention addresses the problems of low expected rates of return and the difficulty of finding guarantors for large payouts by providing two independently useful and mutually complementary modules: A return enhancement module that facilitates the design of games of chance and/or skill such that losers may be the exception rather than the rule. Analytically, this module provides a way to increase the expected return in a game of chance and/or skill involving one or more players.

A payout enhancement module that facilitates larger prize pools by creating financial instruments whose value is linked to the play of one or more games of chance and/or skill. This payout enhancement module may also be used in connection with other events that can be modeled in a game-theoretic framework.

As used herein, the term "residual value" refers to a number, which may preferably be a positive number less than one, used to indicate the portion of a player's financial consideration allocated to purchase of assets rather than to play. It may be expressed as a percentage. In an alternative preferred embodiment, the residual value may be greater than or equal to one, in which case the game sponsor or an affiliated entity may be extending credit to the player.

As used herein, the term "expected rate of return" refers to a predicted average value of return, which may be expressed as an annualized percent.

As used herein, the term "payout structure" refers to a definition showing the set of possible payouts from a game, along with the estimated odds of each payout.

As used herein, the term "token" refers to a lottery ticket, gambling chip, game piece, electronic game piece, or other artifact used to represent value for gaming purposes.

BRIEF DESCRIPTION OF THE DRAWINGS

The above summary of the invention will be better understood when taken in conjunction with the following detailed description and accompanying drawings in which.

DETAILED DESCRIPTION OF THE INVENTION

The present invention addresses the problem of low expected rates of return and the difficulty in finding backers for large prize payouts. It comprises two independently useful and mutually complementary components for expected return enhancement and maximum payout augmentation.

A return enhancement module (REM) that facilitates the creation, modification, and operation of games of one or more players characterized by increased expected return.

A payout augmentation module (PAM) that facilitates the creation and administration of financial instruments linked to gaming or other events and useful to gaming entities and to investors seeking portfolio diversification.

Each of the above modules may be used singly or in combination to facilitate creation and operation of games in which losers are the exception rather than the rule and in which prizes can be substantially larger. In a preferred embodiment, the modules are implemented as part of a secure, interactive, online network, e.g., a virtual private network accessible via an internet protocol. In a preferred embodiment, the modules themselves may be implemented in software, hardware, or any appropriate combination of the two. This allows for efficient design and administration of games and financial instruments.

Figure 1:
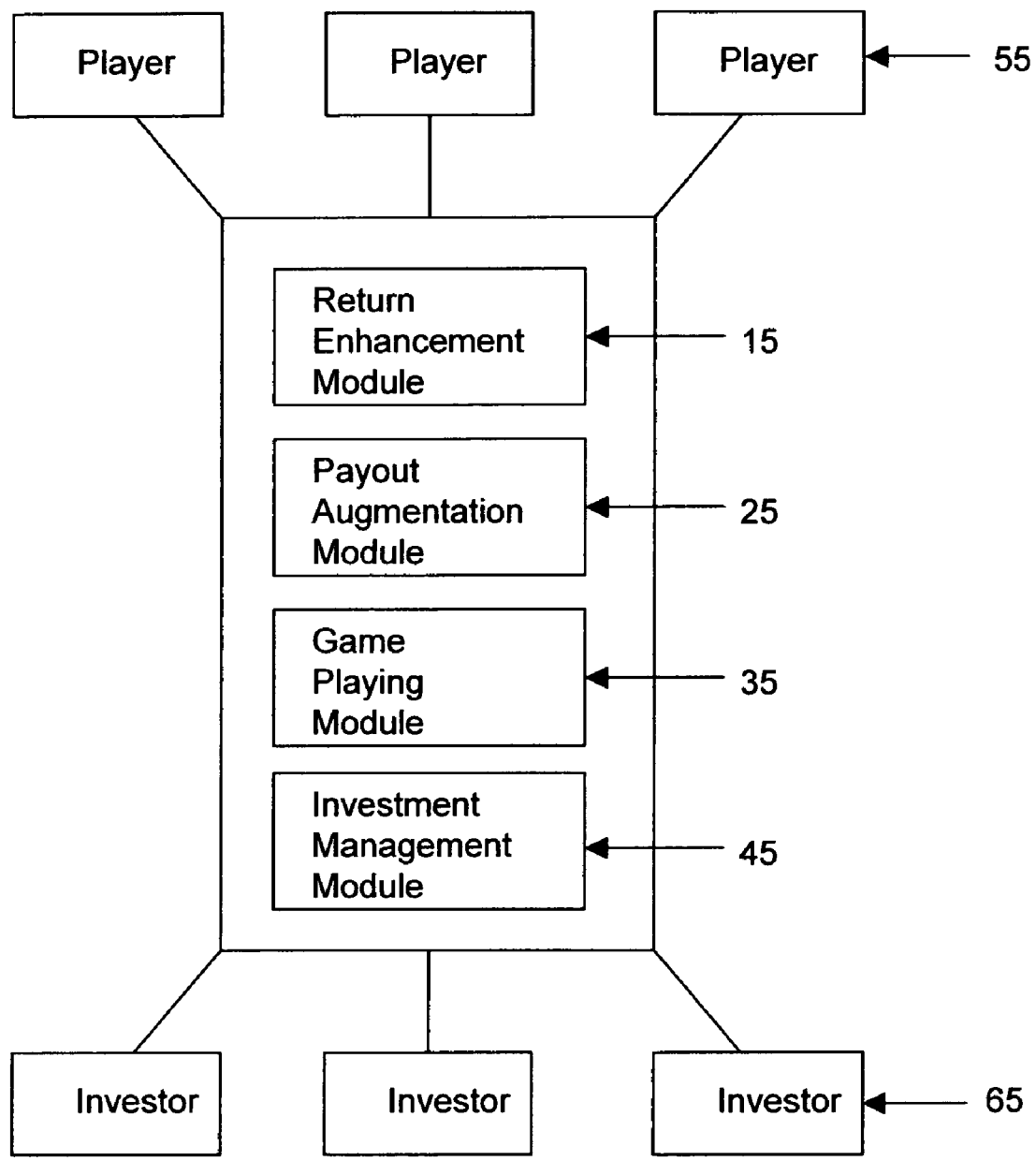
FIG. 1 is a block diagram of an architecture suitable for implementing the present method and system.

A suitable architecture for implementing the present method and system is shown in FIG. 1. As shown in FIG. 1, the architecture comprises a return enhancement module 15, a payout augmentation module 25, a game playing module 35, and an investment management module 45. These modules may preferably be operated and maintained by an entity that conducts one or more games as described below. In some preferred embodiments, one or more of the modules, such as investment management module 45, may be operated and maintained by a distinct entity, such as an investment entity. A plurality of players 55 and investors 65 preferably interact with these modules via appropriate networks and/or other communications means as described above.

Return Enhancement Module

This module provides a way to increase the expected return in a game involving one or more players. For example, this module may be used to change a zero-sum game into a positive sum game that benefits all (or nearly all) players. The module facilitates these benefits without harming the gaming industry's profitability; indeed, it makes possible a significant expansion of an industry whose growth prospects might otherwise be questionable.

REM operates to link games (such as lotteries, casino gambling, and internet gambling) to assets (such as bonds, gold coins, mutual funds, and savings accounts). Games are typically characterized by expected rates of return (to all players, excluding the house) that are zero or negative. Many assets are characterized by expected rates of return that are positive.

The present system and method provide a mechanism by which an entity that conducts games may change the payout structure for players of a game from the payout structure associated with the game alone to a payout structure that is a function of both the game and one or more assets. More specifically, in a preferred embodiment, a residual value is chosen that will be used to determine the portion of a player's financial consideration for participating in the game that will be allocated to the purchase of one or more assets. The assets to be purchased are also chosen. As noted below, the residual value and asset distribution may be determined by either the player or the entity that conducts the game.

When a player submits his or her financial consideration for participation in the game, a portion of the financial consideration (defined by the residual value) is allocated to purchase the one or more assets. As a result, the player's payout structure for participating in the game is modified from that of the game alone and is a function of the game, the selected residual value, and the selected one or more assets.

Three exemplary applications for REM are described below:

REM casinos may issue chips whose value is only partially determined by the outcome of the games played at the casino. Alternatively, the casino may simply record each player's participation without distributing a physical or electronic chip. A residual value (RV), which can range from close to 0% up to close to 100% is preferably retained by the player who may be issued a receipt whenever (s)he buys chips. If the casino operator or affiliated entity extends credit to a player, then the RV can equal or exceed 100%. The receipt, which may be paper-based, or stored in an electronic or analogous data storage device, retains its value for the customer independently of what happens to the chips. The value of the chips for gaming purposes is decremented in the amount of the RV, less an optional processing fee. For example, if the RV is 50%, there is no processing fee, and a player purchases $500 in chips, what the player actually receives is $250 in gaming value and a receipt worth $250 that is linked to one or more assets.

In one preferred embodiment, the residual value would not affect the notional amount of chips issued to a player. A given sum of money would purchase the same apparent notional value of chips no matter which RV is in effect at the time of sale. Such RV is referred to herein as transparent residual value ("TRV"). TRV may preferably be implemented by coding the chips in such manner that a casino's games will recognize the chips net value (face value less residual value) and will automatically adjust payout odds and/or amounts appropriately.

In a second preferred embodiment, the residual value would be reflected in the notional amount of chips issued to a player. A given sum of money would purchase a value of chips reduced by the amount allocated to acquisition of assets. Such RV is referred to herein as subtractive residual value ("SRV"). SRV may preferably be implemented by multiplying the RV percentage by the value of chips notionally purchased to determine the value of chips to be given to the player.

REM internet betting facilities may issue virtual "chips" whose value is only partially determined by the outcome of the games played. Alternatively, the facility may simply record each player's participation without distributing a physical or electronic chip. A residual value (RV), which can range from close to 0% up to close to 100% is preferably retained by the player who may be issued a receipt whenever (s)he buys "chips". If the internet betting facility operator or affiliated entity extends credit to a player, then the RV can equal or exceed 100%. The receipt, which may be paper-based, or stored in an electronic or analogous data storage device, retains its value for the customer independently of what happens to the chips. The value of the chips for gaming purposes is preferably decremented in the amount of the RV, less an optional processing fee. For example, if the RV is 50%, there is no processing fee, and a player purchases $500 in chips, what the player actually receives is $250 in gaming value and a receipt worth $250 that is linked to one or more assets.

REM lotteries. State run lotteries generate billions of dollars in revenue for the states, by dangling a small number of very large prizes in front of millions of suggestible individuals, and spending lavishly on advertising and related promotions. The net result is additional money for the states, a few new millionaires, millions of small losses, and all-too-many ruinous losses.

An REM lottery ticket has a residual value (RV) which can range from close to 0% up to close to 100%. Alternatively, the lottery operator may simply record each player's participation without distributing a physical or electronic ticket. If the lottery operator or affiliated entity extends credit to a player, then the RV can equal or exceed 100%. A receipt, which may be paper-based (e.g., the ticket can serve as the receipt), or stored in an electronic or analogous data storage device, retains its value for the customer independently of the outcome of the lottery. The value of the ticket for gaming purposes is preferably decremented in the amount of the RV, less an optional processing fee. For example, if the RV is 50%, there is no processing fee, and a player purchases $50 in lottery tickets, what the player actually receives is the equivalent of $25 in traditional lottery-ticket value and a receipt worth $25 that is linked to one or more assets.

In each of these examples, REM works by linking gaming to accumulation of assets. These assets may include:

1. fixed income instruments/securities including U.S. government savings bonds 2. equity securities (shares of stock)

3. mutual fund shares, other investment company shares, and/or "folios"

4. derivative instruments with value linked to objectively verifiable economic/financial data 5. bank deposits, including CDs, savings accounts, and interest-bearing checking accounts 6. other approved savings or investment vehicles that might be issued and/or backed by governments, government agencies, corporations, and/or other organizations Specific examples of RV assets may include: long-term bonds with high credit quality, paying a guaranteed rate; shares in an equity index, linked to specific equity securities or broad market indices such as the Standard & Poor's 500 Index.

The expected return from a game designed in accordance with the present invention is preferably a function of a plurality of factors including the RV percentage, the expected return of the underlying asset(s), processing fees if any, holding period of the RV, the expected return of the games played by the player, and the number of plays. In general, the higher the RV, the higher the expected return of the underlying asset(s), the lower the processing fees, the longer the holding period of the RV, the higher (i.e., less negative) the return on play, and the smaller the number of plays, the higher will be the expected rate of return on the game.

One preferred embodiment would combine a high RV with a high expected rate of return on the underlying asset(s), no processing fee, long holding period, near breakeven return on play, and small number of plays. This combination of factors might well provide a higher expected return than many conservative investments.

On the other hand, a low RV with a poor return on play would likely be as poor an investment as a straight lottery ticket (or retail commodity trading) is today.

Features that would discourage turnover on the asset side would have a positive effect on expected returns. If, for example, RVs can be deposited into brokerage accounts, or if state or national lotteries are recast as combination lotteries/savings bond drives, an enormous amount of saving and investment activity could be created. REM savings bonds, issued by the U.S. Treasury, could be bought and sold at banking institutions.

In one preferred embodiment of the present invention, the amount (percentage) and/or type of assets are selected by the players. For example, one player may choose an RV of 50% and an asset type of U.S. government savings bond, while another player may choose an RV of 150% and an asset class of marginable stock.

In another preferred embodiment of the present invention, the amount (percentage) and/or type of assets are selected by the game operators. For example, a New York State Lottery could stipulate an RV of 20% invested in New York State bonds whose proceeds would help finance reconstruction of lower Manhattan. A United States Lottery could stipulate an RV of 80% that would go directly into a players individual retirement account (or comparable Social Security Account, should these exist).

Widespread adoption of games designed in accordance with the present invention may enable operators of lotteries and other games to influence players' choices of assets. Widespread adoption of such games could also reduce the impoverishing effect of gaming while encouraging saving and investment in the individuals and families currently least well served by the investment industry. It could be a "win-win" situation for all concerned: for players, for the gaming industry, and for the securities industry as well.

Figure 2A:
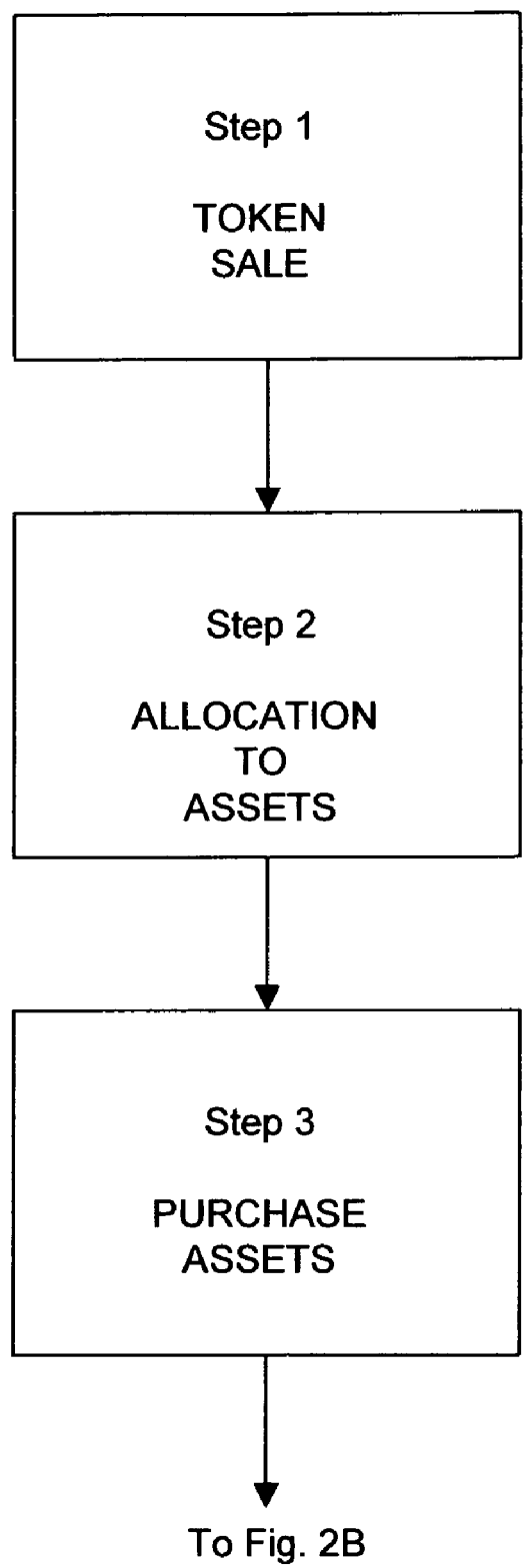
FIG. 2 is a flow chart of a preferred embodiment of the operation and use of the return enhancement module.
Figure 2B:
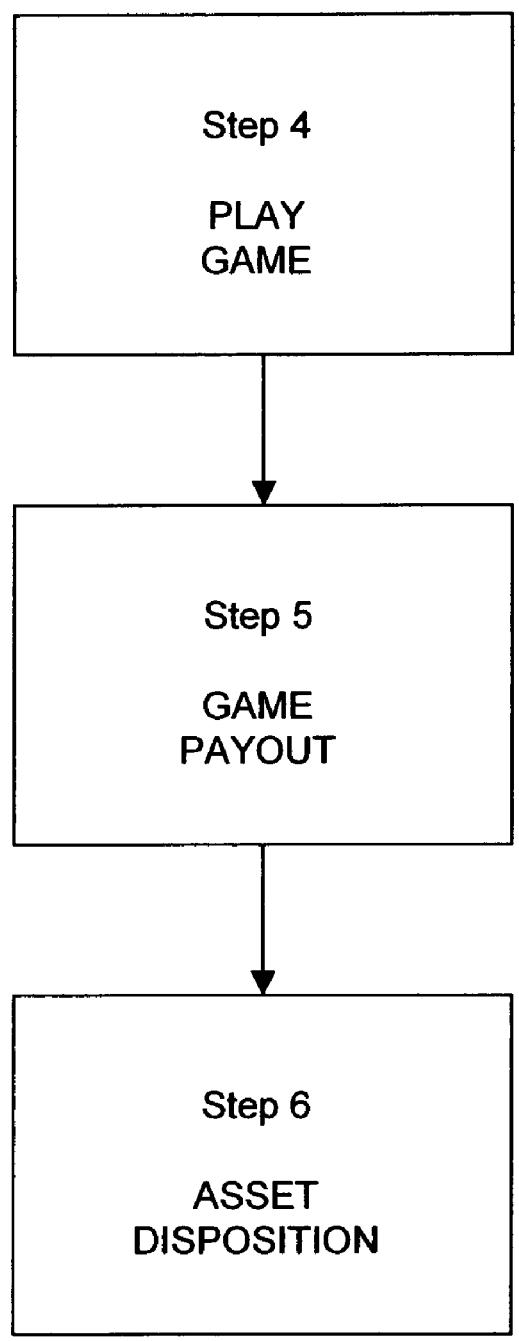
Figure 4:
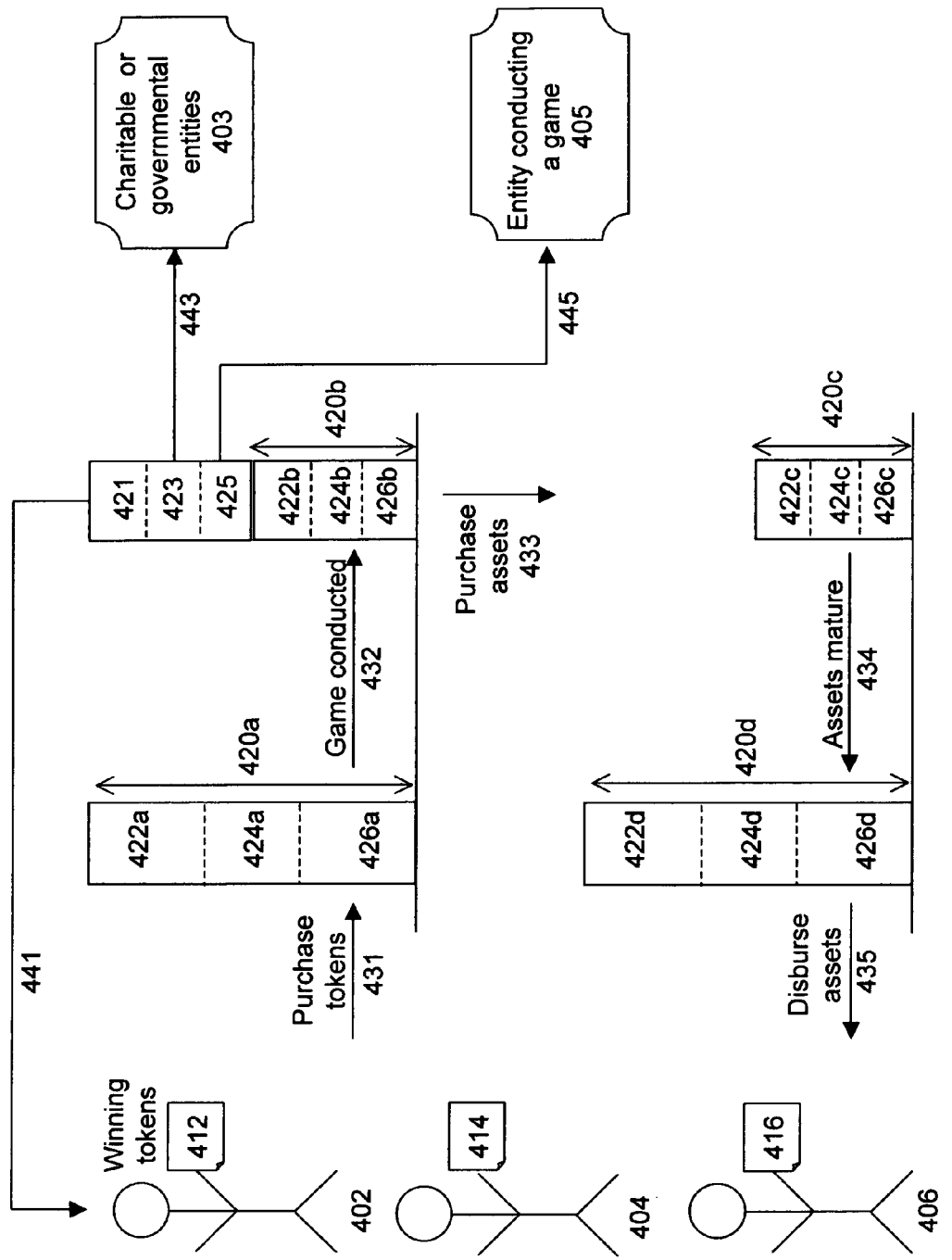
FIG. 4 is an illustration of the flow of money in an embodiment of a game of the present invention.

A preferred embodiment for operation and use of return enhancement module 15 of FIG. 1 is now described in connection with FIG. 2 and FIG. 4. FIG. 2 illustrates the steps of said preferred embodiment. FIG. 4 illustrates the flow of money or other financial consideration in said preferred embodiment.

Flows of money or other financial consideration are shown as solid head arrows in FIG. 4. An example is element 431, the flow of money used to purchase tokens. Said flow of money is from players 402, 404, 406 to an entity 405 conducting a game.

Quantities of money or other financial consideration are shown as vertical bars or vertical open head arrows in FIG. 4. An example of a vertical bar is element 422a. Said element represents the money from player 402 used to purchase a game token 412. An example of an open head arrow is element 420a. Said element represents the total money paid by players 402, 404 and 406 to purchase game tokens 412, 414 and 416 from entity 405 conducting a game.

Stick figures in FIG. 4 each represent a set of one or more individual players. An example is element 402. Said element represents a set of one or more players who win a game as discussed below.

Rectangles with recurved corners in FIG. 4 represent entities. Element 405, for example, represents an entity conducting a game.

Rectangles with a folded corner represent a set of one or more tokens. Element 412 is an example.

As shown in step 1 of FIG. 2 and further illustrated in FIG. 4, an entity 405 conducting a game provides one or more tokens 412, 414, 416 to one or more players 402, 404, 406 for financial consideration 420a. Thus, for example, where the game is a lottery, a player 402 may purchase one or more lottery tickets 412 for, e.g., $1 (422a) per ticket. Alternatively, the entity conducting the game may simply record each player's participation in the game without distributing a physical or electronic token.

For purposes of the present example, it will be assumed that the game to be played is a lottery with the following rules. Six numbers from a total of 48 numbers will be drawn at random. Any ticket holder 402 who correctly identifies all six numbers will share 441 in a prize 421 which pays $50,000,000 over 20 years, with a net present value of $20,000,000. Revenue from ticket sales minus the $20,000,000 needed to fund the prize will be kept 445 by the entity running the lottery and/or distributed 443 to charitable or governmental entities 403 in accordance with any agreements between those entities or as required by law. The amount distributed as prize money is element 421. The amount kept by the entity running the game is 425. The amount distributed to a charitable or governmental entities is element 423. If no prize is awarded, the $20,000,000 is preferably added to the prize pool for a future lottery.

In step 2 of FIG. 2 and as further illustrated in FIG. 4, said entity 405 operating said game allocates a portion 420b of the financial consideration to purchase 433 one or more assets 420c. As noted above, this allocation is preferably determined as a function of the residual values 422b, 424b, 426b defined for the players and/or game. Thus, continuing with the above example, if the residual value is 50%, the entity will allocate 50 cents of every dollar (or other suitable currency) received from the player to the purchase of one or more assets.

In step 3 of FIG. 2, the entity or its agent or other affiliated entity purchases one or more assets with the allocated portion of the financial consideration. Thus, continuing with the above example, if the entire residual value is to be invested in 12-year zero-coupon U.S. government bonds with a 6% yield to maturity, 50 cents of every dollar received from the player will be used to purchase such bonds.

Referring to FIG. 4, in a preferred embodiment, the purchased assets 420c are added to accounts 422c, 424c, 426c associated with the players 402, 404, 406. The accounts may be automatically established upon receipt of financial consideration from the players or may alternatively be a previously established accounts specified by the players or the entity.

Continuing with the above example, if 100,000,000 tickets are sold to 25,000,000 players at a cost of $1 per ticket, and if (for purposes of the example) an RV of 50% is established for the game (i.e., the same RV for every player), and if (for purposes of the example) all allocated portions of the received sales revenue is put to purchase of the above-described bonds, then the present example would result in purchase of $50,000,000 worth of the above-described bonds distributed (preferably as fractional ownership interest in individual bonds) among the 25,000,000 players in accordance with the number of tickets that each player purchased.

In step 4 of FIG. 2 and as further illustrated in FIG. 4, the game is conducted 432 by the entity. Thus, continuing with the above example, lottery numbers for the lottery are drawn and e.g., broadcast or otherwise transmitted by television or other suitable medium to the ticket holders participating in the lottery.

In step 5 of FIG. 2 and as further illustrated in FIG. 4, players 402 who are winners in the game receive 441 payouts 421 in accordance with the rules of the game and the results of the game's playing. Thus, continuing with the above example, if three players each hold one ticket with the winning numbers then each winning player would share in the prize of $50,000,000, whose net present value cost to the entity operating the lottery is $20,000,000. The remaining $30,000,000 would be allocated between the entity running the lottery and the other entities, as noted above. Also, as noted above, if there is no winner, the $20,000,000 prize money would preferably be held as additional prize money for a future lottery.

In step 6 of FIG. 2, each player determines whether he or she wishes to sell one or more of the assets held in his or her account. Continuing with the above example, if the player wishes to sell one or more assets, he or she would receive the current market value of the assets, less a sales commission.

As illustrated in FIG. 4, if the players 402, 404, 406 decided not to sell their assets, the cash value 420d of the assets 422d, 424d, 426d purchased with the allocated portion of the players' financial consideration would, at maturity 434, be approximately equal to the dollar value 420a of the original ticket purchases. The assets would then be disbursed 435 to said players.

Payout Augmentation Module

As noted above, in a preferred embodiment, the present system and method may also comprise a payment augmentation module to facilitate backing of large gaming prizes. This module may be used by the gaming industry (and others such as state-run lotteries, financial institutions, etc.) to offer far larger prizes than would otherwise be possible and otherwise link financial instruments to the outcomes or other events associated with the playing of one or more games. In this aspect, the disclosed system and method employ financial instruments linked to external events ("FILs") that are designed to help insurers and reinsurers to hedge the risk they incur when they guarantee a prize.

For example, say that there are ten state lotteries, each offering $1 billion prizes, each with odds of a hundred to one against there being a winner. Without FILs, insurers and reinsurers are limited to private transactions to apportion the risk among themselves. For large risks, however, they may be left with more collective risk than they want to hold. With FILs, they can hedge that risk by selling a securitized form of the risk they wish to reduce. In the present example, the FIL would be a lottery-backed security ("LBS"). LBSs would be highly attractive to institutional and other investors as portfolio diversifiers, because such investors often need to find assets whose return characteristics have a low correlation to the balance of their portfolios. FILs operate to link games to financial instruments whose value depends upon the outcome or other events associated with those games. Three exemplary applications for PAM are described below:

FILs for casino (or internet) games are preferably fixed- or floating-rate debt instruments linked to the outcome of specific casino (or internet) games (e.g., blackjack) at specific casinos during specific periods of time. These instruments may have a convertibility feature, allowing holders to exchange them at certain periods for a specified amount of equity securities which may be issued by the same or a related issuer. They may also be issued with embedded options, either to allow the issuer to call the debt at certain times and under certain conditions, or to allow the debt-holder to put the debt back to the issuer.

FILs for lotteries are preferably fixed- or floating-rate debt instruments backed by the outcome of specific lottery games (e.g., pick 6 Lotto) offered by specific entities (such as New York State) at specific periods of time. These instruments may have a convertibility feature, allowing holders to exchange them at certain periods for a specified amount of equity securities which may be issued by the same or a related issuer. They may also be issued with embedded options, either to allow the issuer to call the debt at certain times and under certain conditions, or to allow the debt-holder to put the debt back to the issuer.

State run lotteries generate billions of dollars in revenue for the states. By enabling states (and other organizations) to offer much larger prizes, FILs can help these organizations raise additional revenues. In the case of state lotteries, such revenues may allow states to significantly reduce taxes.

Multi-FILs are preferably fixed- or floating-rate debt instruments backed by the outcome of a collection of casino, internet, lottery, and/or other games. They may be created by combining existing FILs or directly. These instruments may have a convertibility feature, allowing holders to exchange them at certain periods for a specified amount of equity securities which may be issued by the same or a related issuer. They may also be issued with embedded options, either to allow the issuer to call the debt at certain times and under certain conditions, or to allow the debt-holder to put the debt back to the issuer. Multi-FILs may be a convenient way for institutional investors to acquire a target allocation in this asset class. They may vary as to composition and percentage breakdown, to allow investment managers greater flexibility and to help address any constraints with respect to investment policies (e.g., investing in state-issued debt may be preferred by one type of fund, another type of fund might exclude certain games or companies to meet a socially responsible investing agenda, etc.)

A beneficial side-effect of FILs is the low expected correlation between their performance and those of conventional securities. Of course, fixed rate debt instruments will be sensitive to changes in interest rates, and convertible bonds will be affected by the general vigor of the economy.

Nonetheless, the underlying value and the return characteristics, driven by the outcome of random events, is by definition uncorrelated to anything else, making FILs a potentially superior source of investment diversification than any existing financial instrument. In a preferred embodiment, fund managers or others may design FILs whose returns will have a correlation coefficient of zero to a given set of other financial instruments. The creation of a market in FILs would not only help create more exciting games for millions of people; it would provide investors, in particular institutional money managers responsible for the retirement security of hundreds of millions of people, with a sorely needed portfolio diversification tool. And it would offer governments an attractive means of raising greater revenues and/or lowering taxes.

Figure 3A:
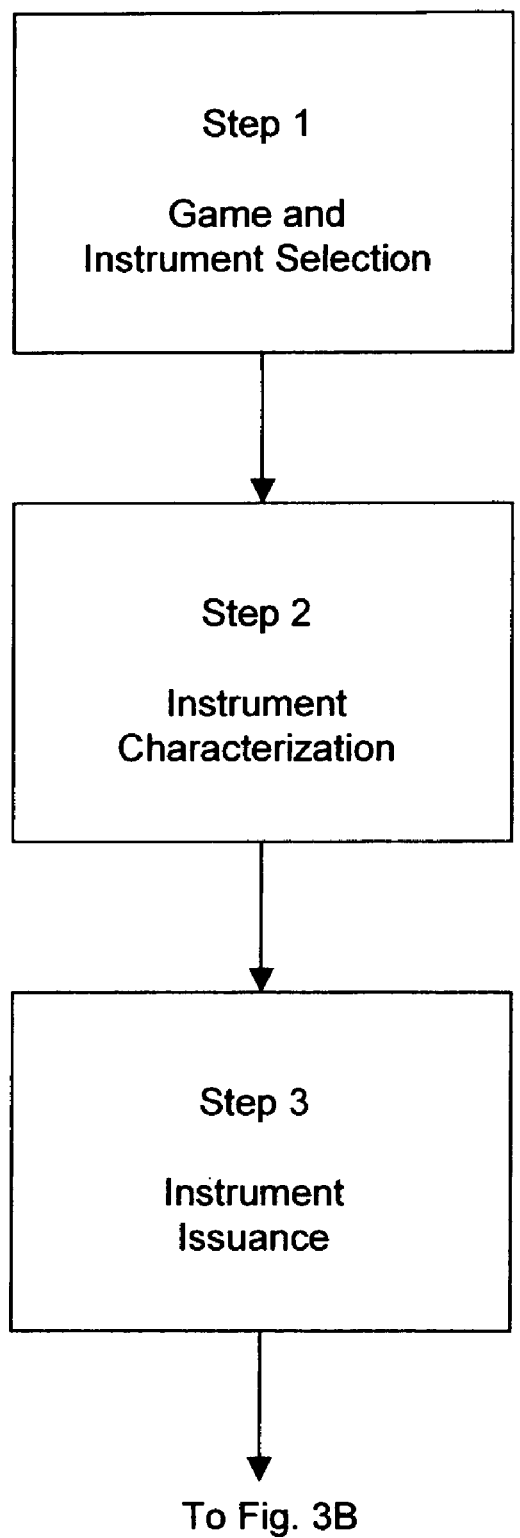
FIG. 3 is a flow chart of a preferred embodiment of the operation and use of the payout augmentation module.
Figure 3B:
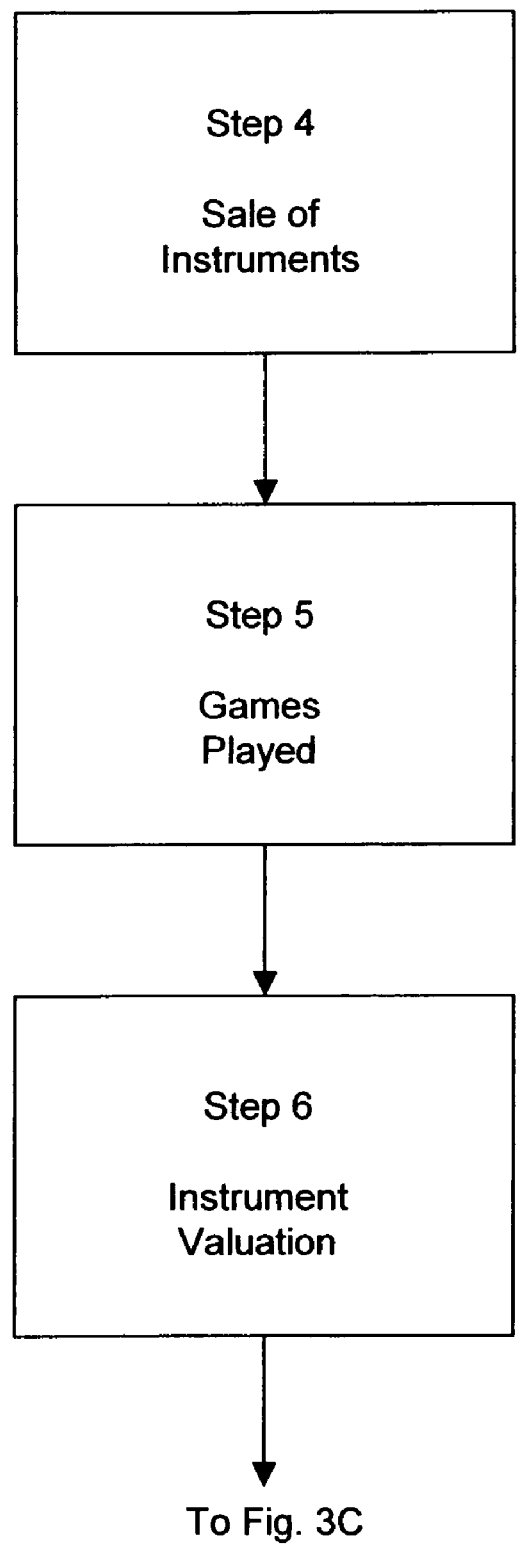
Figure 3C:
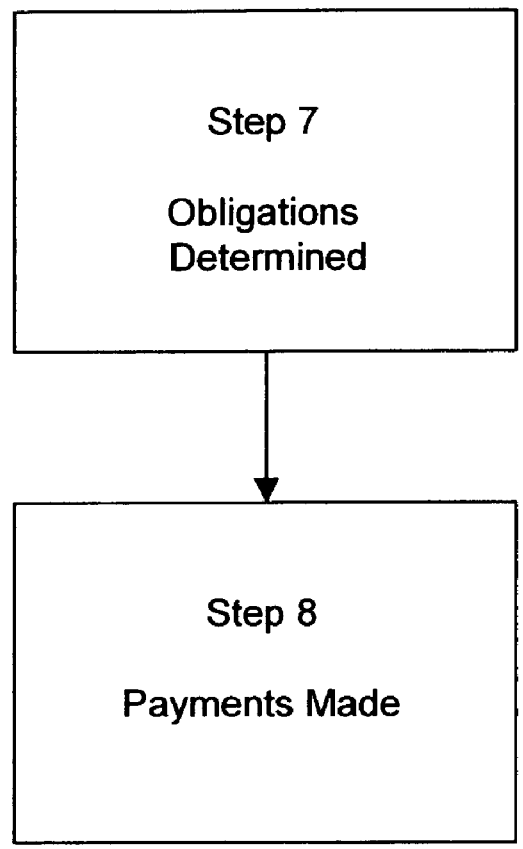

A preferred embodiment for operation and use of payout augmentation module 25 is now described in connection with FIG. 3. As shown in FIG. 3, in step 1, an entity selects one or more games to link to one or more financial instruments. For purposes of example, assume that the entity is an insurance company that wishes to sell corporate bonds and to link the bonds' yield to the outcome of a multi-state lottery.

In step 2, a set of characteristics that define each financial instrument is defined. The characteristics preferably include characteristics that define the financial instrument's value as a function of one or more outcomes or events associated with the one or more games. Thus, continuing with the above example, the insurance company may design par value AAA rated corporate bonds with a yield equal to:

the prevailing yield for this type of credit plus 20 basis points if there is no grand prize winner in the multi-state lottery; and the prevailing yield for this type of credit minus 180 basis points if there is at least one winner.

For purposes of this example, it is assumed that the odds of there being at least one winner in the multi-state lottery are 10 to 1 against.

In step 3, the entity determines the amount of each financial instrument it wishes to issue (e.g., $5,000,000,000 of the bonds defined above). In step 4 the entity sells the one or more financial instruments to one or more buyers at a mutually agreed price and quantity. In a preferred embodiment, these purchasers may include institutional investors desiring to purchase the financial instrument to diversify their portfolios, as described above.

In step 5, the one or more games are played, resulting in one or more outcomes or other events. Thus, continuing with the above example, the lottery is conducted and either results in no winner or in at least one winner.

In step 6, the financial instrument is valued as a function of the one or more outcomes or other events. Thus, continuing with the above example, if there is no winner of the multi-state lottery, the bonds are valued assuming a yield equal to the prevailing yield for this type of credit plus 20 basis points. Alternatively, if there is at least one winner of the multi-state lottery, the bonds are valued at the prevailing yield for this type of credit minus 180 basis points.

In step 7, financial obligations between the entity and purchasers on the one or more financial instruments are determined using the above valuations. In step 8, appropriate payments are made between the parties to satisfy those financial obligations.

While the invention has been described in conjunction with specific embodiments, it is evident that numerous alternatives, modifications, and variations will be apparent to those skilled in the art in light of the foregoing description.

I claim:

1. A method for increasing the expected return of a game, said game comprising a large gaming prize, said large gaming prize being backed at least in part by a payment augmentation module, said payment augmentation module comprising:

the characterization of a lottery backed security;
the issuance of said lottery backed security; and
the selling of said lottery backed security, said method comprising:

a) offering to sell tokens to a plurality of players to participate in said game, each of said tokens having a price and a designated residual value;

b) receiving financial consideration from said players, said financial consideration being equal to the number of said tokens purchased by each of said players times said price of said tokens;

c) allocating a first portion of said financial consideration to a prize pool, said first portion being greater than zero, said prize pool to be distributed among winners of said game, and said prize pool being less than said large gaming prize;

d) conducting said game such that there is an outcome of said game wherein said outcome comprises the designation of a portion of said tokens as winning tokens and/or said outcome additionally comprises the designation of at least one of said winning tokens as a large gaming prize winning token;

e) awarding said prize pool to the owners of said winning tokens if said outcome comprises said designation of winning tokens and awarding said large gaming prize to the owners of said at least one large gaming prize winning token if said outcome comprises said designation of said at least one large gaming prize winning token, wherein at least a portion of said large gaming prize is paid by said payment augmentation module;

f) allocating a second portion of said financial consideration to purchase assets, said assets having a positive expected return over a period of time such that the expected value of said assets at the end of said period of time is greater than or equal to said financial consideration less said prize pool; g) purchasing said assets with said second portion of said financial consideration; h) assigning said assets to said tokens, said assignment to each token being in proportion to the price of each of said token times the residual value of each of said tokens;

i) committing to provide the current market value of said assets at the end of said period of time to the owners of said tokens.

2. The method of claim 1 wherein said game is a casino game, an internet game or a lottery.

3. The method of claim 1 wherein said token is either a paper receipt or an electronic receipt.

4. The method of claim 1 wherein said residual value is 50%.

5. The method of claim 1 wherein said game is a State run lottery and said assets comprise one or more of a savings bond, fixed income securities, shares of stock, mutual fund shares, derivative instruments with value linked to objectively verifiable economic or financial data, long term bonds paying a guaranteed rate, or shares in an equity index linked to either Standard & Poor's 500 index or a broad market index.

6. The method of claim 1 wherein said residual value, said expected rate of return on said assets, said period of time, and said prize pool are chosen such that the expected return of said game is greater than the expected return of a conservative investment.

7. The method of claim 1 wherein said residual value is less than or equal to 80%.

8. The method of claim 1 wherein said assets comprise a bank account paying interest.

9. The method of claim 1 wherein said lottery backed security has a correlation coefficient of zero with respect to a given set of other financial instruments.

10. The method of claim 1 wherein said lottery backed security is a par value AAA rated corporate bond with either a yield equal to the prevailing yield for AAA rated corporate bonds plus 20 basis points if there is no grand prize winner in a multi-state lottery or a yield equal to said prevailing yield for AAA rated corporate bonds minus 180 basis points if there is at least one grand prize winner in said multi-state lottery and wherein said game comprises said multi-state lottery.

11. The method of claim 1 wherein at least a portion of said method is carried out on a computer.

* * * * *